United States Patent
Miyasaka et al.

(10) Patent No.: US 7,782,292 B2
(45) Date of Patent: Aug. 24, 2010

(54) ELECTROPHORETIC DISPLAY DEVICE AND METHOD FOR DRIVING THE SAME

(75) Inventors: Mitsutoshi Miyasaka, Nagano (JP); Yuko Komatsu, Nagano (JP)

(73) Assignee: Seiko Epson Corporation (JP)

( * ) Notice: Subject to any disclaimer, the term of this patent is extended or adjusted under 35 U.S.C. 154(b) by 1152 days.

(21) Appl. No.: 11/390,486

(22) Filed: Mar. 27, 2006

(65) Prior Publication Data

US 2006/0221049 A1 Oct. 5, 2006

(30) Foreign Application Priority Data

Mar. 29, 2005 (JP) ............... 2005-093623
Nov. 21, 2005 (JP) ............... 2005-335293

(51) Int. Cl.
*G09G 3/34* (2006.01)
(52) U.S. Cl. .................................. 345/107
(58) Field of Classification Search .................. 345/107
See application file for complete search history.

(56) References Cited

U.S. PATENT DOCUMENTS 5,124,695 A 6/1992 Green 6,987,503 B2 1/2006 Inoue
7,123,277 B2 * 10/2006 Brown et al. ............... 345/690
7,283,119 B2 10/2007 Kishi
2005/0073512 A1 * 4/2005 Liu ........................... 345/204
2008/0055234 A1 * 3/2008 Chopra et al. ............... 345/107

FOREIGN PATENT DOCUMENTS

| CN | 1150506 C | 5/2004 |
|---|---|---|
| JP | 50-051695 | 5/1975 |
| JP | 64-086116 | 3/1989 |
| JP | 09-090345 | 4/1997 |
| JP | 09-311309 | 12/1997 |
| JP | 2003-195363 | 7/2003 |
| JP | 2004-020818 | 1/2004 |

* cited by examiner

*Primary Examiner*—David L Lewis
(74) *Attorney, Agent, or Firm*—Harness, Dickey & Pierce, P.L.C.

(57) ABSTRACT

In an electrophoretic display device sandwiching an electrophoretic material between a first substrate and a second substrate, a plurality of pixels are formed on the first substrate; each pixel is composed of n subpixels (n being an integer of 2 or more); and the n subpixels contain at least one pair of adjoining subpixels that cannot be divided by a straight line.

15 Claims, 13 Drawing Sheets

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→C→AB→ABC

0→A→BC→ABC

0→A→BC→ABC

0→A→BC→ABC

0→A→BC→ABC

0→C→AB→ABC

0→A→BC→ABC

0→A→BC→ABC

0→C→AB→ABC

0→A→BC→ABC

0→C→AB→ABC

0→C→AB→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

0→A→BC→ABC

GRADATION 0

GRADATION 1

GRADATION 2

GRADATION 3

GRADATION 0

GRADATION 3

GRADATION 1

GRADATION 4

GRADATION 2

GRADATION 0

GRADATION 1

GRADATION 2

GRADATION 3

GRADATION 0

GRADATION 1

GRADATION 2

GRADATION 3

GRADATION 0

GRADATION 1

GRADATION 2

GRADATION 3

ELECTROPHORETIC DISPLAY DEVICE AND METHOD FOR DRIVING THE SAME

RELATED APPLICATIONS

This application claims priority to Japanese Patent Application Nos. 2005-093623 filed Mar. 29, 2005 and 2005-335293 filed Nov. 21, 2005 which are hereby expressly incorporated by reference herein in their entirety.

BACKGROUND

1. Technical Field

The present invention relates to an electrophoretic display device used for electronic paper or the like.

2. Related Art

An electrophoretic display device includes an electrophoretic material containing a liquid dispersion medium and electrophoretic particles between a pair of electrodes and performs display by using electrophoresis of these electrophoretic particles in the dispersion medium. The electrophoretic display device controls the amplitude, polarity, waveform, application time, frequency, and the like of a voltage applied between the electrodes and displays desired information. Although the electrophoretic display device generally performs black/white binary display, it can display the image information more finely if a gray-scale display capable of changing the display brightness is performed. Therefore, realization of such a display is strongly desired. Conventionally, when performing the gray-scale display, an intermediate gray-scale is displayed by changing the voltage to be applied to the electrophoretic display device or the application time, which changes the spatial distribution state of the electrophoretic particles in the dispersion medium (see JP-A-64-86116).

However, due to the characteristic of the electrophoretic display device that maintains the display image even after the power is turned off, there has been a problem in that an after-image stands out when the gray-scale display is performed by adjusting the applied voltage and the application time, as has been done conventionally. For example, when trying to display an intermediate gray-scale such as gray from intense black or intense white, the black or the white from the previous image remains, and, even when the same gray-scale signal is input in order to display gray, a different gray ends up being displayed. Also, it has been extremely difficult to display a multiple number of gray-scales since the charged electrophoretic particles are stopped midway between the electrodes.

SUMMARY OF THE INVENTION

An advantage of the invention is to provide an electrophoretic display device that realizes beautiful and multi-level brightness gray-scales and a method for driving the same.

According to a first aspect of the invention, with an electrophoretic display device sandwiching an electrophoretic material between a first substrate and a second substrate, a plurality of pixels are formed on the first substrate; each pixel is composed of n subpixels (n being an integer of 2 or more); and the n subpixels contain at least one pair of adjoining subpixels that cannot be divided by a straight line.

According to a second aspect of the invention, with an electrophoretic display device sandwiching an electrophoretic material between a first substrate and a second substrate, a plurality of pixels are formed on the first substrate; each pixel is composed of n subpixels (n being an integer of 2 or more); and the n subpixels contain at least one pair of adjoining subpixels whose boundary side is composed of a plurality of straight lines.

According to a third aspect of the invention, with an electrophoretic display device sandwiching an electrophoretic material between a first substrate and a second substrate, a plurality of pixels are formed on the first substrate; each pixel is composed of n subpixels (n being an integer of 3 or more); and the n subpixels contain at least one pair of adjoining subpixels whose boundary side is longer than a boundary side of another pair of adjoining subpixels.

According to a fourth aspect of the invention, with an electrophoretic display device sandwiching an electrophoretic material between a first substrate and a second substrate, a plurality of pixels are formed on the first substrate; each pixel is composed of n subpixels (n being an integer of 2 or more); and at least one subpixel out of the n subpixels does not share a boundary with its adjacent pixel.

It is preferable that the electrophoretic display device is composed of a plurality of (n) subpixels per pixel. It is also preferable that a gap between the adjoining subpixels is 10 µm or less. Further, it is preferable that a gap between the adjoining subpixels is sufficiently shorter than a length expressed by $\sqrt{(S/n)}$ where S is an area of the pixel. The sufficiently shorter gap between the adjoining subpixels means that, more specifically, the gap between the adjoining subpixels is less than one tenth of the length expressed by $\sqrt{(S/n)}$. Further, it is preferable that the n subpixels contain at least one pair of adjoining subpixels whose boundary side is longer than $\sqrt{S}$ where S is the area of the pixel.

In addition to the above-described structure, it is further preferable that, with the electrophoretic display device, the n subpixels composing one pixel have substantially the same area, which enables n+1 brightness gray-scales at the pixel. Substantially the same area means that an area ratio of any two subpixels selected from the n subpixels ranges from 0.9 or more to 1.1 or less.

Moreover, it is preferable that the electrophoretic display device includes a subpixel selection unit that selects i subpixels (i being an integer between 1 and n) from the n subpixels when displaying a brightness gray-scale i in a manner that a boundary side separating a dark display subpixel from a bright display subpixel becomes the longest, provided that a state in which all the n subpixels perform the dark display is a brightness gray-scale 0 and that a state in which the i subpixels perform the bright display and in which n−i subpixels perform the dark display is the brightness gray-scale i.

Further, it is preferable that the electrophoretic display device further includes a subpixel selection unit which makes the i subpixels (i being an integer between 1 and n) located closer to the center of the pixel perform a bright display by selecting the i subpixels from the n subpixels when displaying a brightness gray-scale i, provided that a state in which all the n subpixels perform the dark display is a brightness gray-scale 0 and that a state in which the i subpixels perform the bright display and in which n−i subpixels perform the dark display is the brightness gray-scale i. In contrast, it is preferable that the electrophoretic display device further includes a subpixel selection unit which selects i subpixels (i being an integer between 1 and n) located farther from the center of the pixel to perform a bright display by selecting the i subpixels from the n subpixels as a bright display when displaying a brightness gray-scale i, provided that a state in which all the n subpixels perform the dark display is a brightness gray-scale 0 and that a state in which the i subpixels perform the bright display and in which n−i subpixels perform the dark display is the brightness gray-scale i.

It is preferable that the electrophoretic display device further includes a subpixel selection unit which selects i subpixels (i being an integer between 1 and n) from the n subpixels as a bright display when displaying a brightness gray-scale i in a manner that the display having a smaller area is located more towards an inside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i. In contrast, it is also preferable that the electrophoretic display device further includes a subpixel selection unit which selects i subpixels (i being an integer between 1 and n) from the n subpixels as a bright display when displaying a brightness gray-scale i in a manner that the display having a smaller area is located more towards an outside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i.

According to a fifth aspect of the invention, a method for driving an electrophoretic display device related to the first aspect of the invention includes: selecting i subpixels (i being an integer between 1 and n) from the n subpixels as a bright display in a manner that a boundary side separating a dark display subpixel from a bright display subpixel becomes the longest when displaying a brightness gray-scale i, provided that a state in which all the n subpixels perform the dark display is a brightness gray-scale 0 and that a state in which the i subpixels perform the bright display and in which n−i subpixels perform the dark display is the brightness gray-scale i.

According to a sixth aspect of the invention, a method for driving an electrophoretic display device related to the first aspect of the invention includes: selecting i subpixels (i being an integer between 1 and n) from the n subpixels as a bright display when displaying a brightness gray-scale i in a manner that the display having a smaller area is located more towards an inside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i.

According to a seventh aspect of the invention, a method for driving an electrophoretic display device related to the first aspect of the invention includes: selecting i subpixels (i being an integer between 1 and n) from the n subpixels as a bright display when displaying a brightness gray-scale i in a manner that the display having a smaller area is located more towards an outside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i.

According to an eighth aspect of the invention, a method for driving an electrophoretic display device related to the second aspect of the invention includes: selecting i subpixels (i being an integer between 1 and n) from the n subpixels as a bright display when displaying a brightness gray-scale i in a manner that a boundary side separating a dark display subpixel from a bright display subpixel becomes the longest, provided that a state in which all the n subpixels perform the dark display is a brightness gray-scale 0 and that a state in which the i subpixels perform the bright display and in which n−i subpixels perform the dark display is the brightness gray-scale i.

According to a ninth aspect of the invention, a method for driving an electrophoretic display device related to the second aspect of the invention includes: selecting i subpixels (i being an integer between 1 and n) from the n subpixels as a bright display when displaying a brightness gray-scale i in a manner that the display having a smaller area is located more towards an inside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i.

According to a tenth aspect of the invention, a method for driving an electrophoretic display device related to the second aspect of the invention includes: selecting i subpixels (i being an integer between 1 and n) from the n subpixels as a bright display when displaying a brightness gray-scale i in a manner that the display having a smaller area is located more towards an outside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i.

According to an eleventh aspect of the invention, a method for driving an electrophoretic display device related to the third aspect of the invention includes: selecting i subpixels (i being an integer between 1 and n) from the n subpixels as a bright display when displaying a brightness gray-scale i in a manner that a boundary side separating a dark display subpixel from a bright display subpixel becomes the longest, provided that a state in which all the n subpixels perform the dark display is a brightness gray-scale 0 and that a state in which the i subpixels perform the bright display and in which n−i subpixels perform the dark display is the brightness gray-scale i.

According to a twelfth aspect of the invention, a method for driving an electrophoretic display device related to the third aspect of the invention includes: selecting i subpixels (i being an integer between 1 and n) from the n subpixels as a bright display when displaying a brightness gray-scale i in a manner that the display having a smaller area is located more towards an inside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i.

According to a thirteenth aspect of the invention, a method for driving an electrophoretic display device related to the third aspect of the invention includes: selecting i subpixels (i being an integer between 1 and n) from the n subpixels as a bright display when displaying a brightness gray-scale i in a manner that the display having a smaller area is located more towards an outside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i.

According to a fourteenth aspect of the invention, a method for driving an electrophoretic display device related to the fourth aspect of the invention includes: selecting i subpixels (i being an integer between 1 and n) from the n subpixels as a bright display when displaying a brightness gray-scale i in a manner that a boundary side separating a dark display subpixel from a bright display subpixel becomes the longest, provided that a state in which all the n subpixels perform the dark display is a brightness gray-scale 0 and that a state in which the i subpixels perform the bright display and in which n−i subpixels perform the dark display is the brightness gray-scale i.

According to a fifteenth aspect of the invention, a method for driving an electrophoretic display device related to the fourth aspect of the invention includes: selecting i subpixels (i being an integer between 1 and n) from the n subpixels as a bright display when displaying a brightness gray-scale i in a manner that the display having a smaller area is located more towards an inside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i.

According to a sixteenth aspect of the invention, a method for driving an electrophoretic display device related to the fourth aspect of the invention includes: selecting i subpixels (i being an integer between 1 and n) from the n subpixels as a bright display when displaying a brightness gray-scale i in a manner that the display having a smaller area is located more towards an outside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
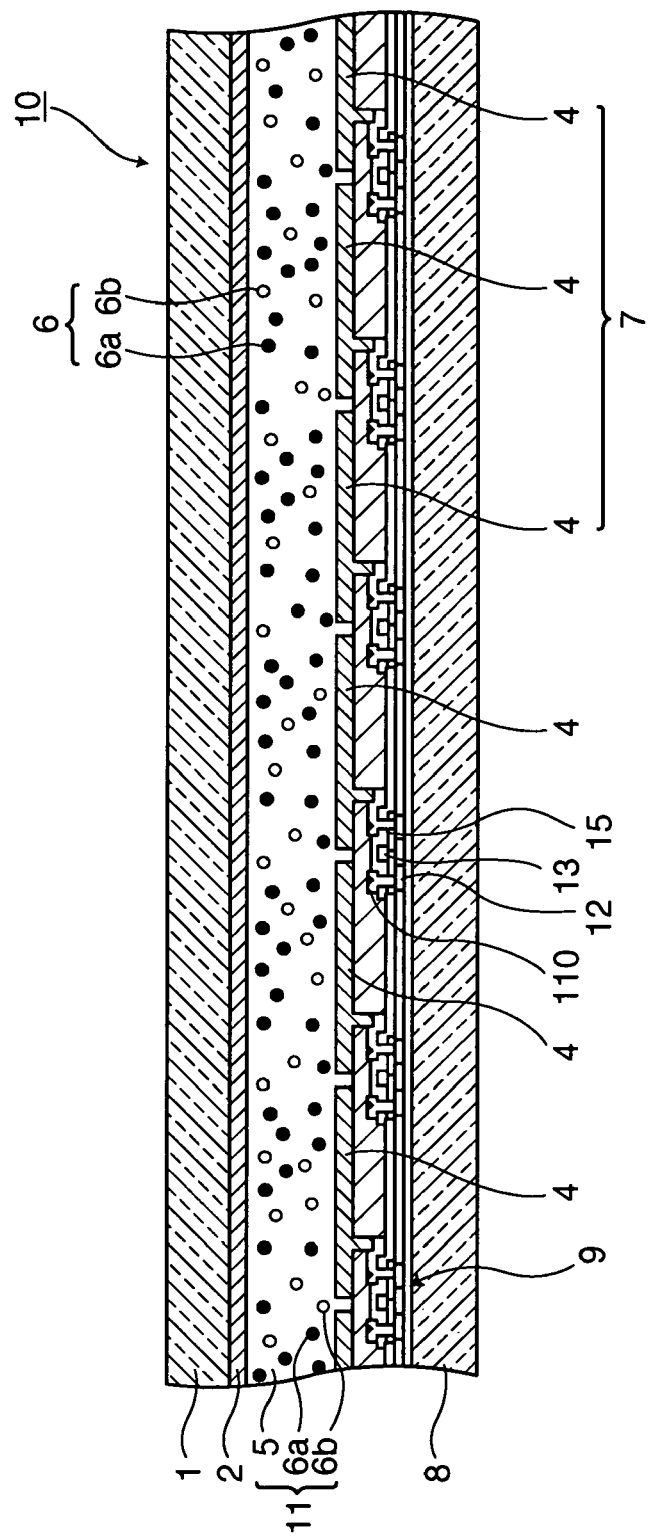
FIG. 1 is a cross-sectional side view of an electrophoretic display device of one embodiment of the invention.

The present invention pertains to an electrophoretic display device (FIG. 1) sandwiching an electrophoretic material between a first substrate and a second substrate and to a method for driving the same. An electrophoretic material 11 contains charged microparticles 6a and 6b in a dispersion medium 5 having flowability so as to change a spatial distribution state of the charged microparticles 6A and 6b between a first substrate 8 and a second substrate 1. By utilizing this change in the spatial distribution state, the electrophoretic display device displays an image. In FIG. 1, the electrophoretic display device changes the particle distribution between subpixel electrodes 4 disposed on the first substrate 8 and a common electrode 2 disposed on the second substrate 1 into a vertical direction. However, the invention is also effective for an electrophoretic display device that changes the particle distribution into a horizontal direction. The invention is also effective for a single-particle system in which one kind of microparticles are positively or negatively charged, and for a two-particle system in which two kinds of microparticles have different colors, with one kind being charged to a reverse polarity from the other. In the following description, regardless of the single-particle system or the two-particle system, one tone obtained from the tone change as a result of the change in the spatial distribution state of the microparticles is called a bright display, and the other tone is called a dark display. For example, when white microparticles are positively charged in a blue dispersion medium, if the blue of the dispersion medium is observed, it may be defined as the dark display, and if the white of the microparticles is observed, it may be defined as the bright display. Further, with the two-particle system containing white and black particles, it may be defined as the bright display if the white particles are observed and the dark display if the black particles are observed. Because the microparticles are charged, their spatial distribution changes depending on the electric field generated between the substrates.

A plurality of pixels 7 are formed on the first substrate 8, with each pixel being composed of n subpixels (n being an integer of 2 or more). The pixels 7 may be arranged in rows and columns. Each subpixel is equipped with a subpixel electrode 4. A predetermined potential is applied to this subpixel electrode 4 via a switching element (i.e., a thin film transistor) 9 associated with each subpixel so as to generate an electric field between the subpixel electrode 4 and the common electrode 2 and to change the spatial distribution state of the microparticles 6a and 6b on the subpixels. As a result, brightness and darkness of the subpixels change. In one embodiment of the invention, the brightness gray-scale of one pixel is adjusted depending on the brightness and darkness of the plurality of subpixels composing this pixel. The n subpixels have substantially the same area. Substantially the same area means that an area ratio of any two subpixels selected from the n subpixels is between 0.9 or more and 1.1 or less. Under these conditions, all subpixels deliver the same performance, and any subpixel within the pixel can be freely selected. As a result, n+1 brightness gray-scales per pixel become possible. Moreover, as will be described hereinafter, as the freedom of selection increases, beautiful gray-scales are realized. More specifically, suppose that a state in which all the n subpixels perform the dark display is a brightness gray-scale 0, and that a state in which all the n subpixels perform the bright display is a brightness gray-scale n. In this case, the pixel can express the intermediate gray-scale i (this will be referred to as an area gray-scale) in a state in which the i subpixels (i being an integer between 1 and n) perform a complete bright display and in which the n−i subpixels perform a complete dark display. The invention has an advantage in that, by controlling electric field leakage among the adjacent subpixels and by taking good advantage of the low resolution of the human eye, the area gray-scale enables the display image to look extremely natural, and a beautiful display is performed by the electrophoretic display device. More specifically, the intermediate gray-scale is achieved using an effect that mixture of the electric fields is generated between the subpixels and that the bright and dark displays are mixed using fine bright and dark patterns unrecognizable by the human eye. It is certainly possible that each pixel shows a gray-scale independently by adjusting the voltage and voltage application time and that, in addition, each pixel shows a high gray-scale by applying the area gray-scale of the invention.

Figure 2:
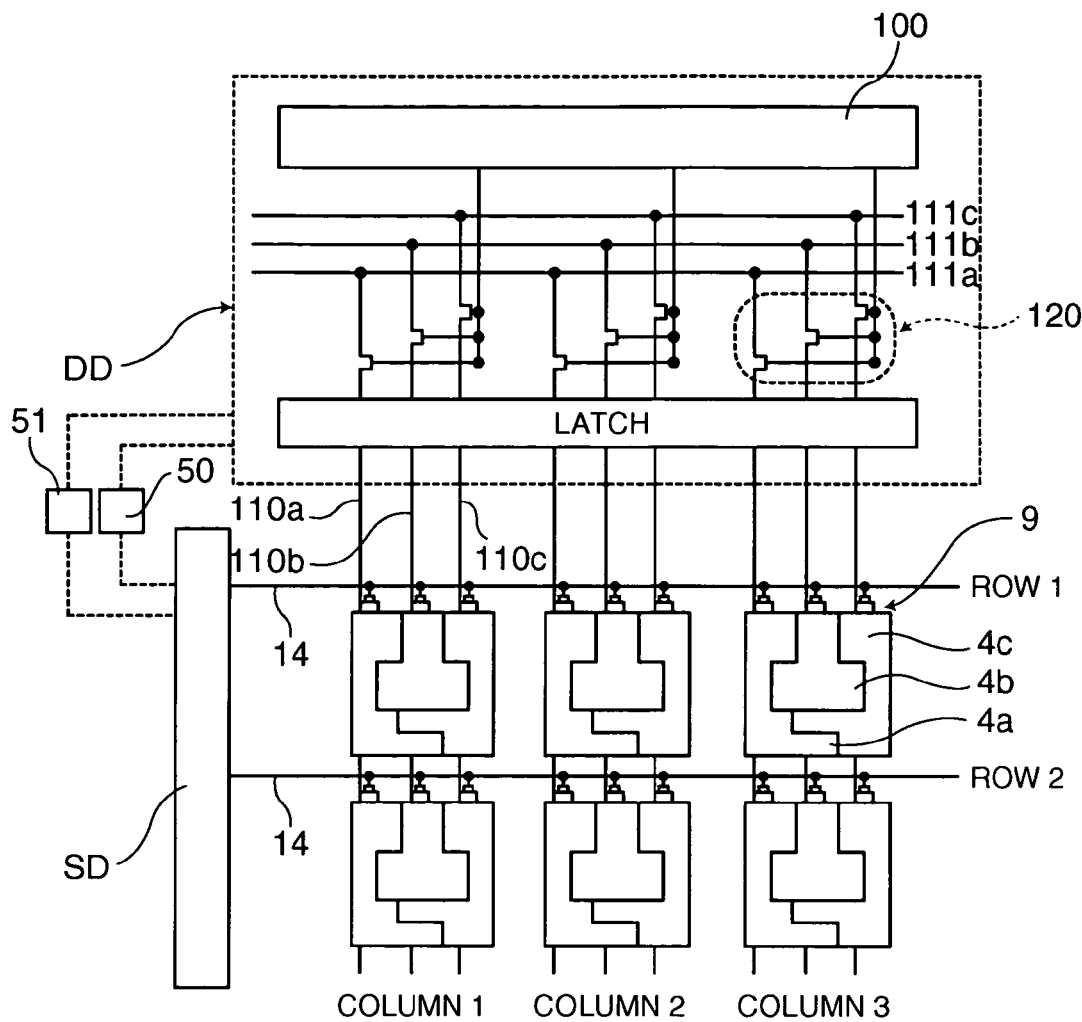
FIG. 2 is a diagram to explain circuitry and pixel configuration of the electrophoretic display device of one embodiment of the invention.

In order to perform a thus-described beautiful gray-scale display, each pixel is provided with n subpixels in the invention. FIG. 2 is a circuit diagram showing one example of the invention. A plurality of pixels are formed on the first substrate in a form of K rows and L columns (both K and L being integers of 2 or more). Each pixel is composed of n subpixels, each subpixel being coupled to the switching element composed of the thin film transistor (TFT) and the like. In the example of FIG. 2, one pixel is composed of three subpixels 4a, 4b, and 4c (n=3). On the outside of the pixels arranged in the K rows and L columns, a data driver circuit DD and a scanning driver circuit SD are provided so as to input each individual image signal to each subpixel via the switching element 9. L×n subpixels composing the pixels that are arranged in one row are all coupled to one scanning line. When the scanning driver circuit SD selects one specific row from the K scanning lines, all the L×n switching elements coupled to the selected row are switched on. In contrast, each column is composed of individual n data lines. The number of data lines n in one column is equivalent to the number of the n subpixels per pixel. In the example of FIG. 2, there are three subpixels composing one pixel, and, thus, there are three data lines 110a, 110b, and 110c in one column. The data driver circuit DD includes a column select unit 100, n signal lines 111a, 111b, and 111c, and column select transistors 120. The n signal lines 111a, 111b, and 111c supply image signals to the n data lines 110a, 110b, and 110c via the column select transistors. That is, the n signal lines correspond to the respective n data lines. The column select unit 100 selects one specific column out of L columns. When all the n column select transistors coupled to the selected column turn to an on state, and the n data lines composing this column are made to correspond to the respective n signal lines, the image signal is input to each data line. More specifically, either one of the source or the drain of the column select transistor is coupled to the signal line, and the other one of the source or the drain is coupled to the data line. The gate of the column select transistor is thereby linked to an output of the column select unit. In a point sequential driving, in which the pixels are sequentially selected per row while one scanning line is being selected, an image signal is directly input into the n data lines. As shown in FIG. 2, if the data driver circuit DD has a latch circuit LATCH, line sequential driving becomes possible, in that the image signal corresponding to each data line is first maintained in the latch circuit, and the image signal is input into the L×n subpixels during a period at which the object row is selected. The column select unit 100 is composed of a decoder and a shift register.

In short, in the invention, each of the pixels arranged in K rows and L columns is composed of the n subpixels having the same area, with each subpixel being coupled to the switching element. The on/off of these subpixel switching elements is controlled by the scanning select signal that is sent to the scanning line. Each column has the n data lines corresponding to the n subpixels, and the n subpixels correspond to the respective n data lines via the subpixel switching elements. Further, the n data lines correspond to the respective n signal lines, and the n column select transistors are provided between these n data lines and n signal lines. The on/off of the column select transistors is controlled by a column select signal sent from the column select unit. Having such a structure, the external control circuits become extremely simple because the brightness gray-scale signal per pixel is constantly output to the n signal lines from the external control circuits, and, under the circumstances, the electrophoretic display device realizes the area gray-scale. In reality, a storage device (VRAM) of the display device carries the gray-scale data of each pixel. For example, the VRAM carries information such as "pixel Pst located at row s and column t is brightness gray-scale m." When rewriting the pixel Pst, the gray-scale data of the pixel Pst is called from this storage device (VRAM), and the called gray-scale data is converted into n digital signals expressing brightness and darkness, which are allotted to the n signal lines. Further, via the n signal lines and the n data lines located in the column t, the image signal is input to the n subpixels located at row s and column t. However, if one pixel is stretched over two rows, or the number of the signal lines differs from the number of the data lines, or the number of the data lines differs from the number of the subpixels, for example, the control by the external circuits becomes complicated, because the signal must be rearranged or the timing for calling the image signal from the VRAM must be adjusted. In contrast, in the invention, the external control circuits are extremely simplified since the area gray-scale can be done only by calling the image signal from the VRAM in the order that the image signal is written into each pixel.

Figure 3:
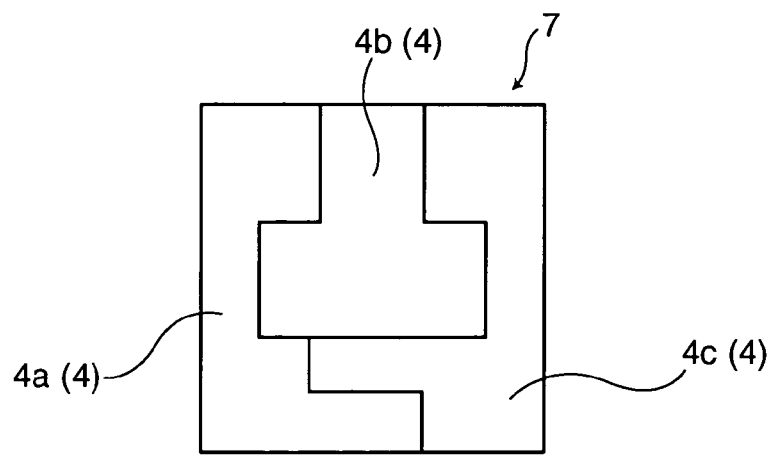
FIG. 3 is a diagram to explain one exemplary pixel used in the electrophoretic display device of one embodiment of the invention.

In the electrophoretic display device of one embodiment of the invention, each pixel is composed of n (n being the integer of 2 or more) subpixels. However, these n subpixels contain at least one pair of adjoining subpixels that cannot be completely divided by a single, continuous, straight line that extends entirely across the pixel. In other words, the n subpixels contain at least one pair of adjoining subpixels whose boundary side is composed of a plurality of interconnected straight lines that extend at angles relative to one another (i.e., the boundary side is zigzagged). An example thereof will be described using FIG. 3. FIG. 3 shows one exemplary pixel of one embodiment of the invention, in that one pixel 7 is composed of three subpixels 4a, 4b, and 4c. The pixel 7 is substantially square whose one side length has 6 units. Each of the subpixels has the same area, within an error range, of about 6 units×2 units. No pair of subpixels can be completely divided by one straight line extending across the pixel 7, and the boundary side between the adjoining subpixels is composed of a plurality of straight lines interconnected to one another at angles. For example, the boundary side between the subpixels 4a and 4b is composed of 4 straight lines extending orthogonally relative to one another. Also, the boundary side between the subpixels 4a and 4c is composed of 3 straight lines extending orthogonally relative to one another, and the boundary side between the subpixels 4b and 4c is composed of 4 straight lines extending orthogonally relative to one another. That is, in the example of FIG. 3, there are three pairs of adjoining subpixels that cannot be completely divided by a straight line extending across the pixel 7. In the electrophoretic display device of one embodiment of the invention, the pixel contains at least one pair of subpixels whose boundary side is thus complicatedly engaged with each other. If the boundary sides between the subpixels are complicatedly engaged with each other, the human eye cannot recognize the boundary sides and sees the intermediate display as a mixture of bright and dark displays. In other words, even though the bright or dark display is a digital display per subpixel in reality, we virtually see the intermediate gray-scale, and a beautiful gray-scale expression is achieved (this will be referred to as a fine mixture in the present specification). The fine mixture is effective when the subpixel area is 31250 $\mu m^2$ or less. It is particularly effective when the pixel area is 62500 $\mu m^2$ (equivalent to a 250 $\mu m$×250 $\mu m$ square) or less and when the subpixel area is 31250 $\mu m^2$ (two subpixels is equivalent to one pixel mentioned above) or less. If the pixel and the subpixel are smaller than these, the human eye normally cannot recognize the subpixels, and when white and black are displayed on the subpixels, for example, we see gray which is the intermediate of white and black.

Figure 4A:
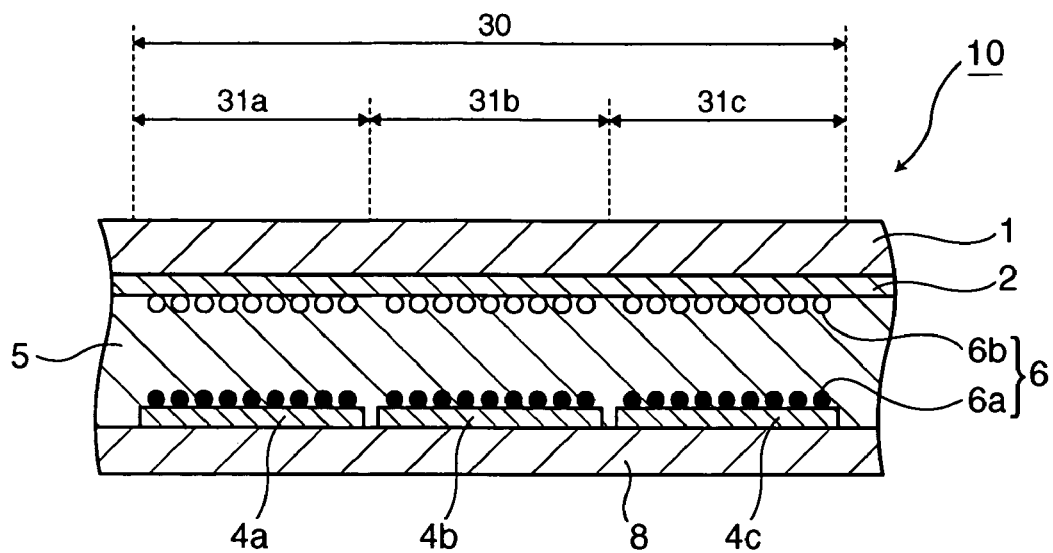
FIGS. 4A and 4B are diagrams to explain principles of the invention.
Figure 4B:
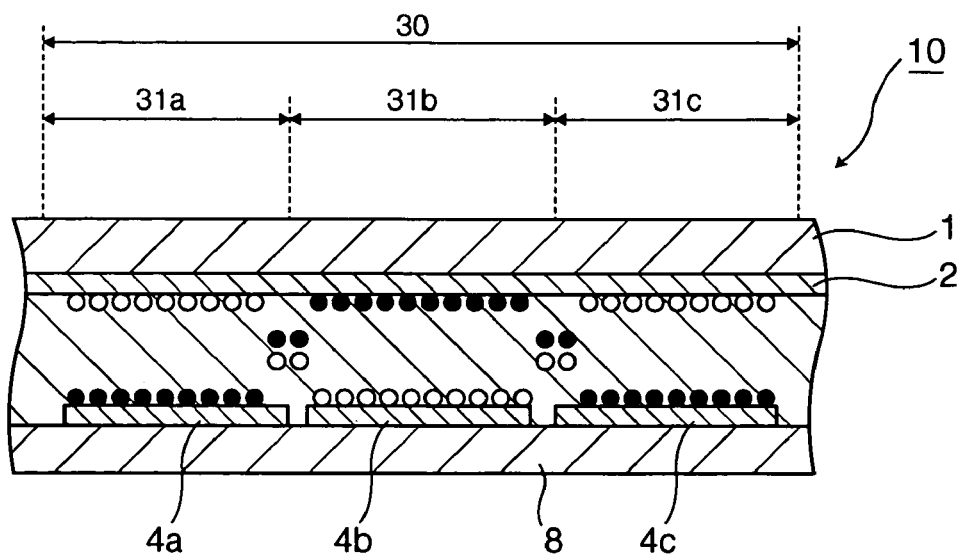

In addition to the fine mixture as described, the effect of one embodiment of the invention has an electrical amplification. This point will be explained using FIGS. 4A and 4B. FIG. 4A is an example in which all three subpixels 31a, 31b, and 31c that compose one pixel 30 are displaying white (the bright display), and, as a result, the pixel 30 is displaying completely white (a brightness gray-scale 3). Suppose that the white microparticles 6b are now negatively charged, and the black microparticles 6a are positively charged. Under this condition, if potentials of the subpixel electrodes 4a, 4b, and 4c are set lower than the potential of the common electrode 2 so as to generate an electric field directed to the three subpixel electrodes from the common electrode, the pixel 30 performs bright display. For example, suppose that a positive potential such as +5V or +10V is given to the common electrode, and potentials lower than this potential (e.g., a ground potential 0V) are given to the subpixel electrodes. Then, when the negatively charged white microparticles are drawn to the common electrode while the positively charged black microparticles are drawn to the subpixel electrodes, the pixel 30 displays entirely white as shown in FIG. 4A. In contrast, in FIG. 4B, one subpixel 4b located in the middle displays black (the dark display), and the pixel 30 displays whitish gray (a brightness gray-scale 2). In order to perform such an display, the potentials of the subpixel electrodes 4a and 4c are set lower than the potential of the common electrode 2, and, further, the potential of the subpixel electrode 4b in the middle is set higher than the potential of the common electrode 2. Suppose, for example, that the potential of the common electrode 2 is set relatively low in the positive such as +5V, and the potentials of the subpixel electrodes 4a and 4c are set even lower (e.g., the ground potential 0V), while the potential of the subpixel electrode 4b is set higher in the positive than the common electrode potential (e.g., +10V). Then, the white microparticles of the subpixels 31a and 31c are drawn to the common electrode side to display white, while the black microparticles of the subpixels 31b are drawn to the common electrode side to display black. If the subpixels are large, the subpixels 31a and 31c show entirely white, while the subpixel 31b shows entirely black. However, if the subpixels are small and the distance between the subpixels is sufficiently shorter than the thickness of the EPD material 11 (that is, the distance between the first and second substrates), the electric fields in the opposite directions mix at the boundary between a bright display region (the subpixel 31a or 31c in FIG. 4B) and a dark display region (the subpixel 31b in FIG. 4B), thereby creating a region in which the white and black microparticles are not completely drawn to either of the electrodes (FIG. 4B). As a result, the boundary side region separating the subpixels becomes an intermediate display between the bright and dark displays (in this case, gray), and the bright display region becomes an incomplete bright display (in this case, grayish white) instead of becoming a completely bright display (in this case, complete white). Similarly, the dark display region becomes an incomplete dark display (in this case, grayish black) instead of becoming a completely dark display (in this case, complete black). As thus shown, when the electric fields at the boundary region between the subpixels mix, the intermediate gray-scale can be expressed (this effect will be hereinafter referred to as an electric field mixture in the specification).

The electric field mixture is more effective when the distance between the subpixels (that is, the distance between the first and second substrates) is sufficiently shorter than the thickness of the EPD material 11 (when the distance is approximately the EPD material thickness times 0.176, or less), and when the gap between the adjoining subpixels is about 10 $\mu m$ or less. The electric field directed up towards the common electrode from the end portion of the subpixel electrode has a spreading angle of about 10° at the maximum. Therefore, the electric field spreads up to an approximate distance of the EPD material thickness multiplied by tan 10 (=0.176) at the common electrode side. The EPD material has a thickness of at least 60 $\mu m$. Therefore, the spreading of the electric field at the common electrode side becomes 10 $\mu m$. If the gap between the adjoining subpixels is 10 $\mu m$ or less, the electric field mixture takes place between the adjoining subpixels, and a beautiful gray-scale expression is achieved. Further, in the invention, it is desirable that the gap between the adjoining subpixels is sufficiently shorter than a proper length of the subpixel. The proper length of the subpixel (subpixel proper length) is a square root of the subpixel area and is a length expressed by $\sqrt{(S/n)}$ where S is an area of one pixel. In addition, the gap sufficiently shorter means, more specifically, a gap that is one tenth or less of the subpixel proper length expressed by $\sqrt{(S/n)}$. If the gap between the adjoining subpixels is about the same or larger than the subpixel proper length, the charged microparticles 6a and 6b located above and between the subpixels do not respond to the upper or the lower electric field. As a result, the intermediate gray-scale is shown between the subpixels regardless of the subpixel potential, and the contrast of the pixel as a whole weakens. However, if the gap between the subpixels is sufficiently shorter than the subpixel proper length and is shorter than the thickness of the EPD material times 0.176, the charged microparticles always respond to the electric field generated by the subpixel electrodes, and the problem of weak contrast does not take place. Additionally, because the electric field mixture works effectively, the bright display is displayed brightly, the dark display is displayed darkly, and the intermediate gray-scale is displayed as a beautiful gray-scale of well-mixed bright and dark.

The shorter the distance between the subpixels is and the longer the boundary side of the adjoining subpixels is, the more effective the described fine mixture and the electric field mixture become. This is because, if the distance between the subpixels is short, the electric fields from the subpixels mix with each other easily, and if the boundary side length is longer than a pixel proper length or the subpixel proper length, the fine mixture becomes even finer. Accordingly, in one embodiment of the invention, the n subpixels composing one pixel include at least one pair of (two) adjoining subpixels whose boundary sides between two or more adjoining subpixels have a total length longer than the pixel proper length. (Hereinafter, unless otherwise stated in the specification, the boundary side indicates the boundary side between the subpixels that belongs to the same pixel. The boundary side between the subpixels composing a different pixel is called a pixel boundary, and its side is called a pixel boundary side.) The pixel proper length is a square root of the pixel area and is the length expressed by $\sqrt{S}$ where S is the pixel area. In the example of FIG. 3, one pixel is composed of a square whose one side is 6 units in length and whose area is 6 units×6 units, and its pixel proper length is 6 units. In contrast, because the subpixel 4a has the boundary side of 6 units in length between the subpixel 4b and has the boundary side of 4 units in length between the subpixel 4c, the total length of the boundary sides of the subpixel 4a is 10 units. Similarly, the total boundary side length of the subpixel 4b is 14 units, and the total boundary side length of the subpixel 4c is 12 units. (note that, the total pixel boundary side length of the subpixel 4a is 12 units; the total pixel boundary side length of the subpixel 4b is 2 units; and the total pixel boundary side length of the subpixel 4c is 10 units.) That is, in the example of FIG. 3, any of the subpixels composing one pixel has the total boundary side length longer than 6 units. Accordingly, the electric field mixture and the fine mixture between the subpixels become more effective, and a more beautiful intermediate gray-scale is achieved. As shown in this example, the pixel according to the embodiment of the invention is provided with at least one pair of subpixels having the total subpixel boundary side length longer than the pixel proper length, and, even if the image signal to each subpixel is the black/white binary signal, the pixel as a whole enables a smooth and picturesque intermediate gray-scale display.

Similarly, when each pixel is composed of n (n being an integer of 3 or more) subpixels, the n subpixels may contain at least one pair of adjoining subpixels whose boundary side is longer than the boundary side of another pair of adjoining subpixels. In other words, when one pixel is composed of the n (n being the integer of 3 or more) subpixels, at least two subpixels have the total boundary side length longer than that of any remaining n–2 subpixels. Each of the n subpixels shares the boundary side with its adjoining subpixel, and the total length of the boundary side becomes the value specific to each subpixel. At least two subpixels, with each subpixel having the total boundary side length that is not the smallest of the total boundary side lengths of the subpixels composing this pixel, can be selected out of these n subpixels. This will be explained again using FIG. 3. The subpixel 4a shares the total boundary side length of 10 units with its adjoining subpixel; the subpixel 4b shares the total boundary side length of 14 units with its adjoining subpixel; and the subpixel 4c shares the total boundary side length of is 12 units with its adjoining subpixel. That is, in FIG. 3, each of the n (n=3) subpixels composing one pixel has a unit of the total boundary side length different from its adjoining subpixel. Each pair of subpixels 4b and 4c has the total boundary side length longer than the other subpixel (the subpixel 4a). Out of the pair of subpixels 4b and 4c, 4c has the smaller total boundary side length but has the larger total boundary side length compared to the subpixel 4a. By having such a structure, the effects of the fine mixture and the electric field are enhanced, and a beautiful intermediate brightness gray-scale can be expressed.

Figure 5:
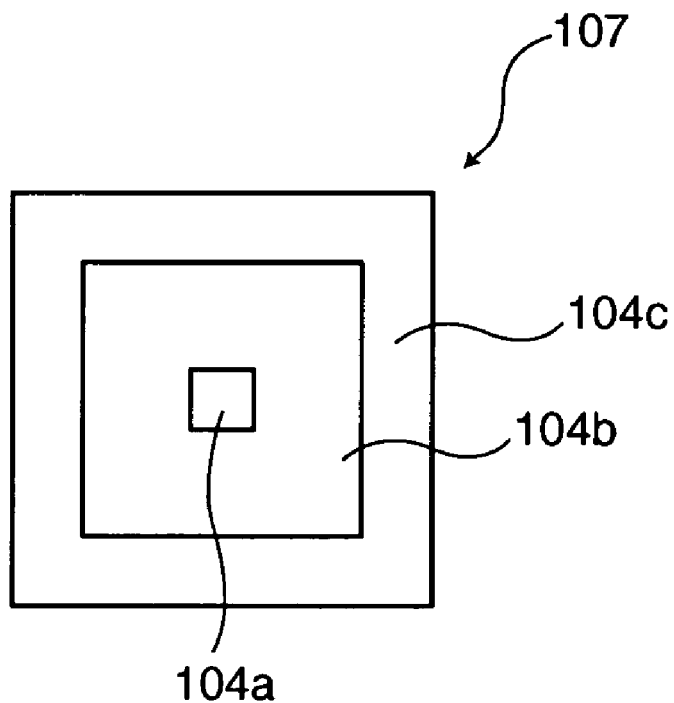
FIG. 5 is a diagram to explain one exemplary pixel used in the electrophoretic display device of one embodiment of the invention.

As a method for expressing the beautiful intermediate brightness gray-scale, each pixel may be composed of n (n being an integer of 2 or more) subpixels, and at least one of these n subpixels may not share a boundary with an adjacent pixel. In other words, the plurality of subpixels are concentrically arranged to compose one pixel (FIG. 5). In FIG. 5, one pixel is composed of three subpixels 104a, 104b, and 104c, each of which is concentrically arranged. As a consequence, only the outermost subpixel 104c shares the boundary with the adjacent pixel, and the other subpixels 104a and 104b do not share the boundary with the adjacent pixel. With such a concentric arrangement of the subpixels, the fine mixture becomes outstandingly effective, and an extremely beautiful intermediate brightness gray-scale can be realized.

Figure 6:
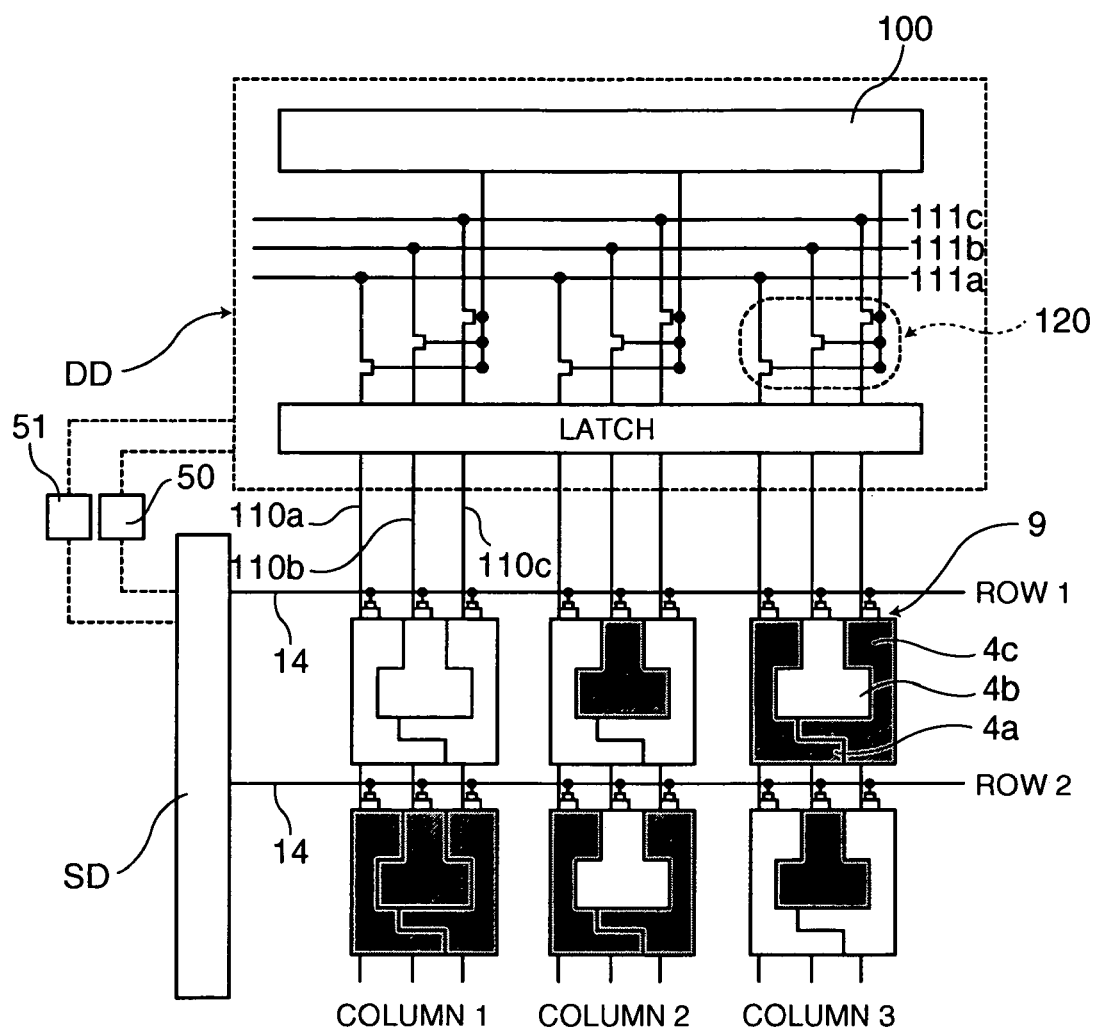
FIG. 6 is a diagram to explain pixels used in the electrophoretic display device of one embodiment of the invention and one exemplary method for driving the pixels.

Now, the method for driving the electrophoretic display device of one embodiment of the invention will be described. As described above, the area of each subpixel in the invention is substantially the same, and, therefore, there is a degree of freedom in deciding which subpixel to select when displaying the intermediate gray-scale. In order to take good advantage of the effects of the fine mixture and the electric field mixture, it is desirable to drive the electrophoretic display device so that i subpixels are selected from the n subpixels as the bright display when the pixel displays a brightness gray-scale i, in a manner that the boundary side separating the dark display subpixel from the bright display subpixel within the pixel becomes the longest. Further, for this reason, the electrophoretic display device of the invention is provided with such a subpixel selection unit. FIG. 6 is a diagram explaining the described driving method and the electrophoretic display device. In each pixel, there are 3 subpixels 4a, 4b, and 4c; the adjoining subpixels contain at least one pair of subpixels that cannot be completely divided by a single straight line; the boundary side between the adjoining subpixels is composed of a plurality of straight lines angled relative to one another; and the total subpixel boundary side lengths are not uniform, in that there are more than two subpixels having their total boundary side lengths longer than that of the other subpixel. Further, the electrophoretic display device shown in FIG. 6 is provided with a subpixel selection unit 50 which makes the i subpixels out of the n subpixels to display bright in a manner that the boundary side separating the dark display subpixel from the bright display subpixel becomes the longest within the pixel. In FIG. 6, the pixel located at row 1/column 1 shows the brightness gray-scale 3 (bright display); the pixels located at row 1/column 2 and row 2/column 3 indicate the brightness gray-scale 2; the pixels located at row 1/column 3 and row 2/column 2 indicate the brightness gray-scale 1; and the pixel located at row 2/column 1 shows the brightness gray-scale 0 (dark display). Because the subpixel 4b, among the three subpixels 4a, 4b, and 4c, has the longest total boundary side length, the subpixel 4b displays reverse of what the other two subpixels display. For example, to display the brightness gray-scale 2, the subpixel 4b displays dark, and the remaining subpixels 4a and 4c display bright. Also, to display the brightness gray-scale 1, the subpixel 4b displays bright, and the remaining subpixels 4a and 4c display dark. That is, to perform the intermediate gray-scale, the electrophoretic display device as described herein is driven in a manner that the total subpixel boundary side length of the subpixel 4b is made constantly the longest by the subpixel selection unit 50. As a consequence, the fine mixture and the electric field mixture are reliably generated, and the beautiful intermediate gray-scale can be displayed. Additionally, since the subpixels 4a and 4a always perform the same display, the subpixels 4a and 4c may be combined, the data lines 110a and 110c may be combined, and the signal lines 111a and 111c may be combined when displaying the four gray-scales.

Figure 7A:
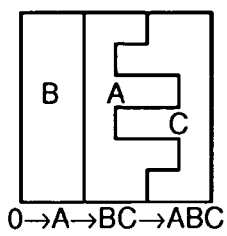
FIGS. 7A through 7U are diagrams to explain pixels used in the electrophoretic display device of one embodiment of the invention and one exemplary method for driving the pixels.
Figure 7B:
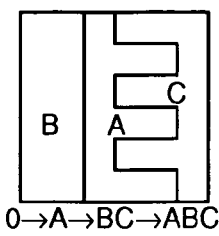
Figure 7C:
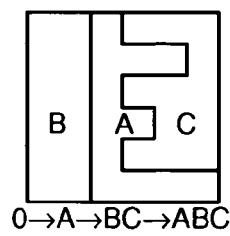
Figure 7D:
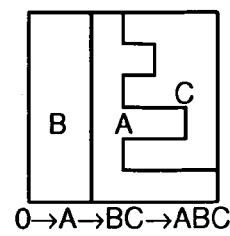
Figure 7E:
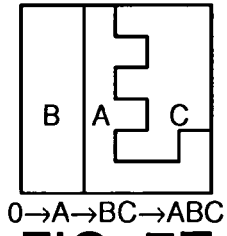
Figure 7F:
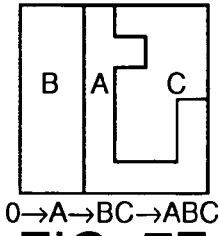
Figure 7G:
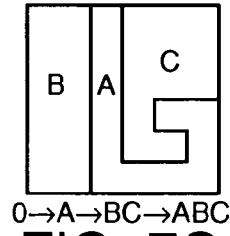
Figure 7H:
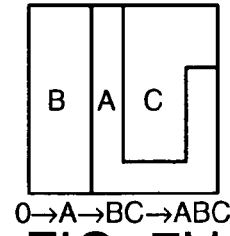
Figure 7I:
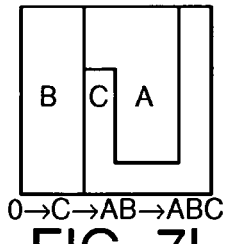
Figure 7J:
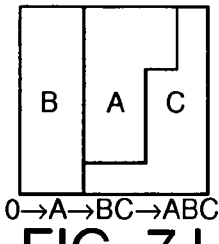
Figure 7K:
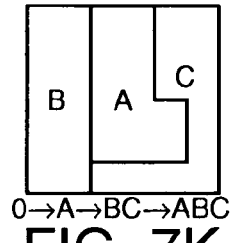
Figure 7L:
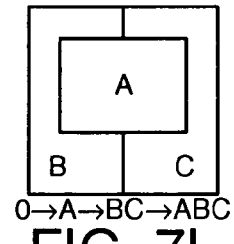
Figure 7M:
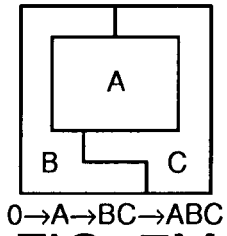
Figure 7N:
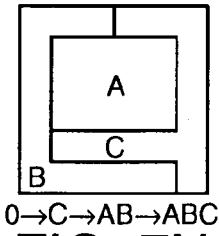
Figure 7O:
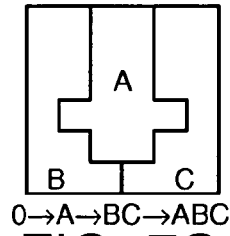
Figure 7P:
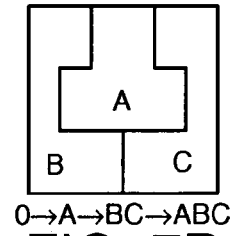
Figure 7Q:
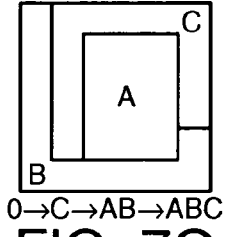
Figure 7R:
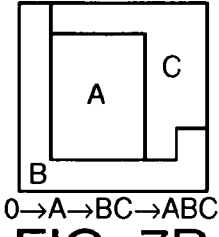
Figure 7S:
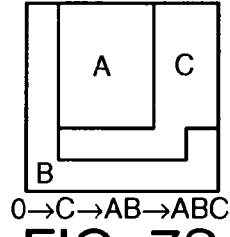
Figure 7T:
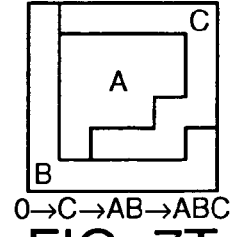
Figure 7U:
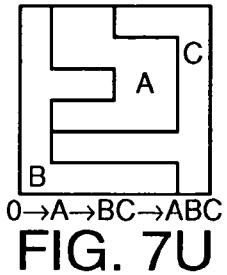
Figure 8A:
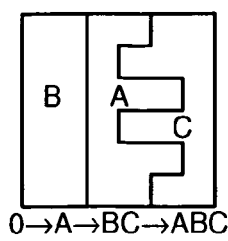
FIGS. 8A through 8U are diagrams to explain pixels used in the electrophoretic display device of one embodiment of the invention and one exemplary method for driving the pixels.
Figure 8B:
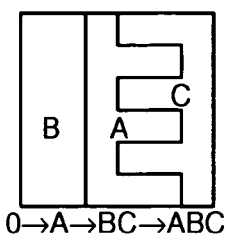
Figure 8C:
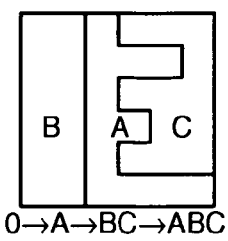
Figure 8D:
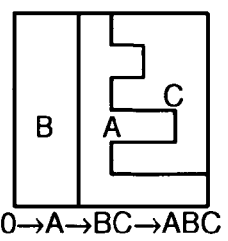
Figure 8E:
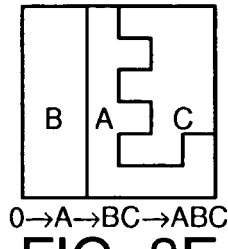
Figure 8F:
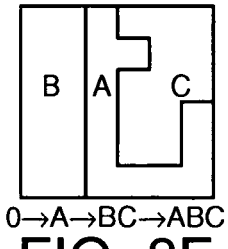
Figure 8G:
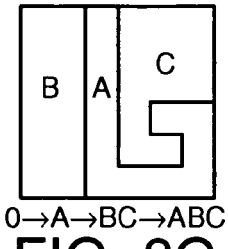
Figure 8H:
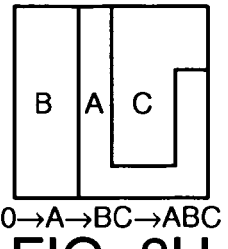
Figure 8I:
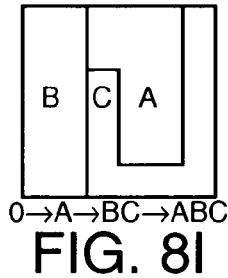
Figure 8J:
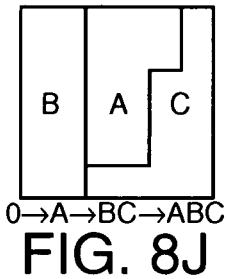
Figure 8K:
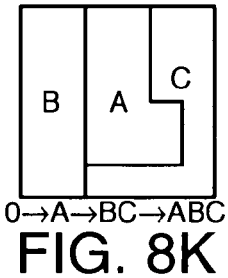
Figure 8L:
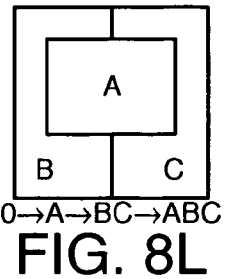
Figure 8M:
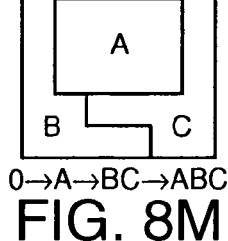
Figure 8N:
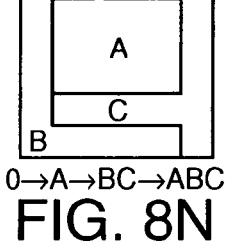
Figure 8O:
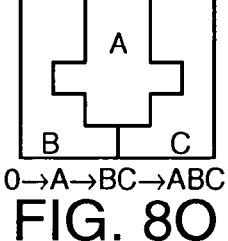
Figure 8P:
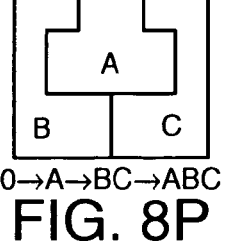
Figure 8Q:
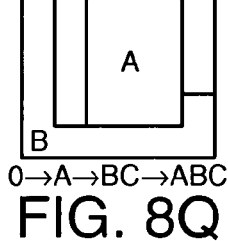
Figure 8R:
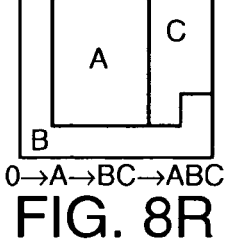
Figure 8S:
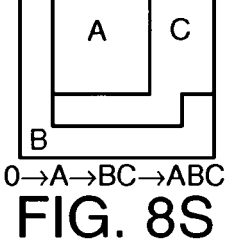
Figure 8T:
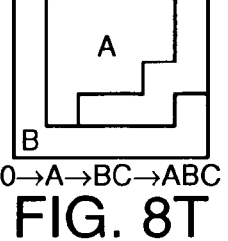
Figure 8U:
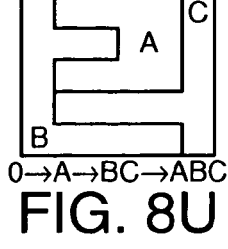

In addition, FIGS. 7A through 7U show exemplary subpixel patterns and the driving method of the described embodiment of the invention. FIGS. 7A through 7U illustrate some of the configurations of the subpixels composing one pixel and show the driving method using alphabets and arrows such as O→A→BC→ABC. O→A→BC→ABC indicates dark display subpixels at each gray-scale. The driving method is shown in a manner that, more specifically, all the subpixels display bright for a complete bright display at the brightness gray-scale 3 (O); a subpixel A displays dark while subpixels B and C display bright at the brightness gray-scale 2 (A); the subpixel A displays bright while subpixels B and C display dark at the brightness gray-scale 1 (BC); and all the subpixels display bright for a complete dark display at the brightness gray-scale 0 (ABC). By making the subpixels to be engaged with one another and by driving them in a manner that the total boundary side length between the subpixels displaying the bright and the dark becomes the longest when displaying the intermediate gray-scale, the beautiful gray-scale display is achieved with the well-mixed bright and dark.

Other methods for driving the electrophoretic display device according to the embodiments of the invention include: a method in which, when the pixel displays the brightness gray-scale i, the bright is displayed by selecting the i subpixels located closer to the center of the pixel out of the n subpixels, and, in contrast, a method in which the bright is displayed by selecting the i subpixels located farther from the center of the pixel out of the n subpixels. Moreover, by combining the two, the bright display may be displayed by selecting the i subpixels located farther from the center of the pixel from the n subpixels when the i of the brightness gray-scale i is larger than half the number n of the n subpixels (i>n/2), and by selecting the i subpixels located closer to the center of the pixel from the n subpixels when the i of the brightness gray-scale i is smaller than half the number n of the n subpixels (i<n/2). Also, for this reason, the electrophoretic display device of the invention is provided also with such a subpixel selection unit. Thus, by altering the bright and the dark starting from the near center of the pixel, polarization of the bright and dark stretching over the plurality of pixels can be eliminated, and a macroscopically beautiful gray-scale can be achieved. As an example that does not employ the above structure, suppose that one pixel is made up of three subpixels and that one pixel and the next pixel perform the brightness gray-scale 2 (in which two subpixels display bright and one subpixel displays dark). In the left pixel out of the two pixels, the subpixel located at the far right displays dark, and, in the right pixel, the subpixel located at the far left displays dark. Basically, although a person looking at the display image normally cannot recognize each subpixel because it is too small, he or she recognizes that it is the dark display in this situation because the two pixels aligned next to each other are displaying the same dark display. Therefore, a person looking at the display image does not see it as the intermediate gray-scale but recognizes it as minute black and white dots being aligned, and, thus, a beautiful intermediate gray-scale is not displayed. In contrast, with a structure as one according to the embodiment of the invention, if the bright display is selected starting from the subpixel either close to or far from the pixel center, the mixture always occurs between the subpixels that perform the differing bright and dark displays within the pixel in the intermediate gray-scale state, and, therefore, the beautiful intermediate gray-scale is realized within the pixel. This will be explained again using FIG. 6. In FIG. 6, the subpixel 4b having the largest total boundary side length is located closer to the pixel center than the other subpixels are. Therefore, in the pixels located at row 1/column 3 and row 2/column 2 showing the brightness gray-scale i=1, the i (one) subpixel closer to the center of the pixel is selected from the n subpixels (n=3) to display bright. Further, to the contrary, in the pixels located at row 1/column 2 and row 2/column 3 showing the brightness gray-scale i=2, the i (two) subpixels located farther from the center of the pixel are selected from the n subpixels (n=3) to display bright. As a consequence, the fine mixture and the electric field mixture are reliably generated in each pixel, and the beautiful intermediate gray-scale is realized per pixel. It is ideal that the subpixels within the pixel are arranged in the order from the one having the longest total boundary side length to the one having the shortest total boundary side length towards the circumference. Additionally, that the subpixel is close to the pixel center means that a value of moment of inertia regarding the pixel electrode gravity center of this subpixel, as expressed by the formula below, is small.

$$I_i = \int (x^2 + y^2) dm$$

The moment of inertia regarding the pixel gravity center of the subpixel i is an integral of mass of all parts of the subpixel i, dm, multiplied by a distance from the pixel gravity center squared, $(x^2+y^2)$. Each subpixel is allotted with its own moment of inertia which determines its distance from the pixel center, and the subpixel close to the center (having a small value of moment of inertia) is selected for either the bright display or the dark display. Further, it is preferable to arrange the subpixels inside the pixel in a manner that the moment of inertia of a subpixel having a long total boundary side length is as small as possible. FIG. 8 is relative to the structure of the embodiment of the invention, showing one example of the driving method in which the bright display is selected starting always from the subpixel close to the pixel center or far from the pixel center. How to read FIG. 8 is the same as FIG. 7. When displaying dark using one of the three subpixels, the subpixel A is to display dark, and, when displaying bright using one of the three subpixels, the subpixel A is to display bright because it is the closest to the pixel center.

As another method for driving the electrophoretic display device of one embodiment of the invention, it is preferable to select the i subpixels from the n subpixels as the bright display when displaying the brightness gray-scale i, in a manner that the display having a smaller area is located more towards the inside than the display having a larger area upon comparison of a total area of dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i. Further, for this reason, the electrophoretic display device of the invention is also provided with such a subpixel selection unit. In contrast, when displaying a brightness gray-scale i, the i subpixels may be selected from the n subpixels as the bright display in a manner that the display having a smaller area may be located more towards the outside than the display having a larger area upon comparison of a total area of the dark display subpixels with a total area of the bright display subpixels. Similarly to the previous method, the electrophoretic display device of the invention is provided also with such a subpixel selection unit. With the structure of the embodiment of the invention, by combining the subpixels that perform the display having a smaller total area and arranging them near the center, or by combining the subpixels that perform the display having a larger total area and arranging them near the center, the mixture between the subpixels that separately displaying bright and dark within the pixel always occurs in the intermediate gray-scale state, and, within this pixel, a beautiful intermediate gray-scale is displayed. Accordingly, by changing the bright and dark displays starting from the near center of the pixel, the polarization of bright and dark stretching over the plurality of pixels can be eliminated, and a macroscopically beautiful gray-scale can be realized. This will be described again using FIG. 6. The electrophoretic display device shown in FIG. 6 is provided with a subpixel selection unit 51 which selects the i subpixels from the n subpixels as the bright display in a manner that the display having a smaller area is located more towards the inside than the display having a larger area upon comparison of a total area of the dark display subpixels with a total area of the bright display subpixels. As a result, in the pixels located at row 1/column 3 and row 2/column 2 showing the brightness gray-scale i=1, the i (one) subpixel 4b is selected from the n (n=3) subpixels as the bright display in a manner that the bright display region having a smaller area is set closer to the center of the pixel, since the bright display area is smaller than the dark display area. Similarly, in the pixels located at row 1/column 2 and row 2/column 3 showing the brightness gray-scale i=2, the i (one) subpixel 4b is selected from the n (n=3) subpixels as the dark display in a manner that the dark display region having a smaller area is set closer to the center of the pixel, since the dark display area is smaller than the bright display area. As a consequence, the fine mixture and the electric field mixture are reliably generated within each pixel, and the beautiful intermediate gray-scale can be displayed per pixel.

Figure 9:
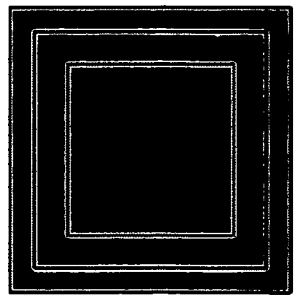
FIG. 9 explains pixels used in the electrophoretic display device of one embodiment of the invention and one exemplary method for driving the pixels.
Figure 9:
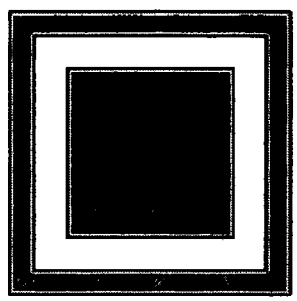
Figure 9:
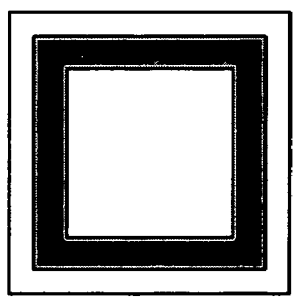
Figure 9:
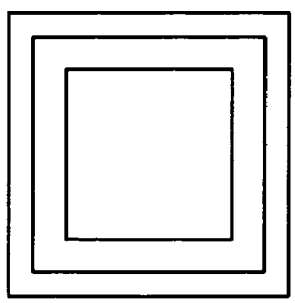

As yet another method for driving the electrophoretic display device of the invention, it is also preferable to form the pixel so as to contain n subpixels (n being an integer of 2 or more), to form the n subpixels so as to contain at least one subpixel that does not share the boundary with its adjacent pixel, and to select i subpixels (i being an integer between 1 and n) from the n subpixels as a bright display when displaying the brightness gray-scale i in a manner that the boundary side separating the dark display subpixel from the bright display subpixel becomes the longest, provided that a state in which all the n subpixels perform the dark display is the brightness gray-scale 0 and that a state in which the i subpixels perform the bright display and in which n−i subpixels perform the dark display is the brightness gray-scale i. Further, it is therefore preferable that the electrophoretic display device according to one embodiment of the invention is provided also with such a subpixel selection unit. In other words, the subpixels are selected in a manner that the total length of the boundary side separating the bright display from the dark display is the longest even in a pixel in which one or more subpixels do not share their boundaries with their adjacent pixel and are arranged amongst other subpixels. Also, the electrophoretic display device according to the embodiment of the invention is provided with such a subpixel selection unit. As a consequence, the fine mixture and the electric field mixture are reliably generated, and the beautiful intermediate gray-scale can be displayed. One example of such a driving method is shown in FIG. 9. In FIG. 9, one pixel is composed of three subpixels having an equal area, and these subpixels are arranged concentrically. The innermost subpixel is a square of 1 unit on a side (called an inner subpixel). The subpixel located outside the inner subpixel has a shape that is remained after hollowing out the square of 1 unit on a side out of a square of √2 unit (1.414 units) on a side (called a middle subpixel). The subpixel located at the outermost side has a shape that is remained after hollowing out the square of √2 unit (1.414 units) on a side out of a square of √3 unit (1.732 units) on a side (called an outer subpixel). The only subpixel, of the three subpixels, that shares the boundary with the adjacent pixel is the outermost subpixel. This pixel can display four gray-scales. All the subpixels perform the dark display at the gray-scale 0, and all the subpixels perform the bright display at the gray-scale 3. When the middle subpixel displays bright, and the inner and outer subpixels display dark at the intermediate gray-scale 1, the total length of the boundary side between the bright and dark displays becomes the longest. Further, at the intermediate gray-scale 2, the middle subpixel displays dark while the inner and outer subpixels display bright, and, thus, the total length of the boundary side between the bright and dark displays becomes the longest. At the intermediate gray-scales 1 and 2, the middle subpixel always displays reverse of what the inner and outer subpixels display, and therefore, the fine mixture and the electric field mixture are reliably enhanced at both of the gray-scales, and the beautiful intermediate gray-scale is realized.

Figure 10:
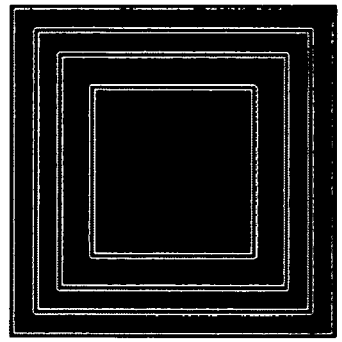
FIG. 10 explains pixels used in the electrophoretic display device of one embodiment of the invention and one exemplary method for driving the pixels.
Figure 10:
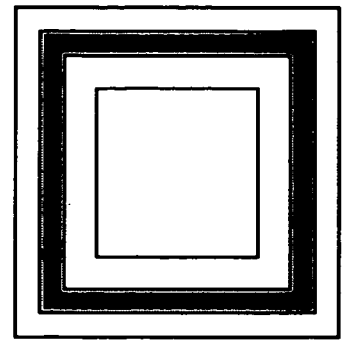
Figure 10:
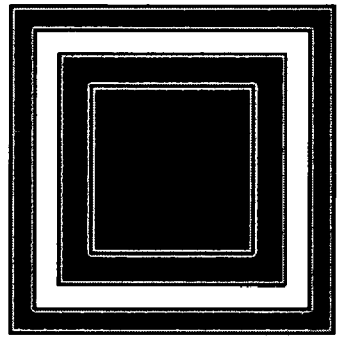
Figure 10:
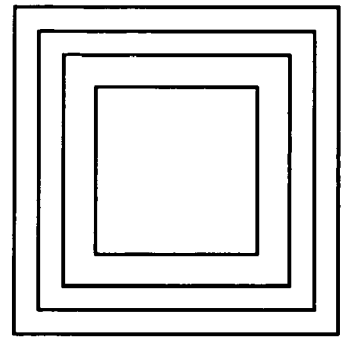
Figure 10:
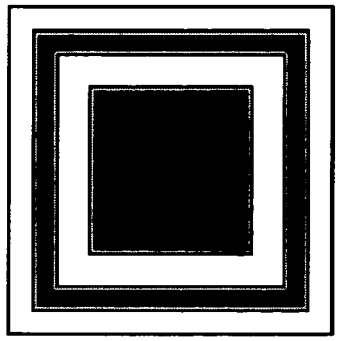

In addition, FIG. 10 shows one example of the driving method of another embodiment of the invention. In FIG. 10, one pixel is composed of four subpixels, each having an equal area and arranged concentrically. The subpixel located at the innermost side is a square of 1 unit on a side (called a subpixel 1). The subpixel located outside the subpixel 1 has a shape that is remained after hollowing out the square of 1 unit on a side out of a square of √2 unit (1.414 units) on a side (called a subpixel 2). The subpixel located outside the subpixel 2 has a shape that is remained after hollowing out the square of √2 unit (1.414 units) on a side out of a square of √3 unit (1.732 units) on a side (called a subpixel 3). The subpixel located at the outermost side has a shape that is remained after hollowing out the square of √3 unit (1.732 units) on a side out of a square of √4 unit (2 units) on a side (called an outer subpixel). The only subpixel, of the four subpixels, that shares the boundary with the adjacent pixel is the outermost subpixel. This pixel can display five gray-scales using the four subpixels having the equal area. All the subpixels perform the dark display at the gray-scale 0, while all the subpixels display bright at the gray-scale 4. At the intermediate gray-scale 1, when the subpixel 3 displays bright and the other subpixels display dark, the total length of the boundary side between the bright and dark displays becomes the longest. Further, at the intermediate gray-scale 2, the subpixels 1 and 3 display dark while the subpixels 2 and 4 displays bright, and, thus, the total length of the boundary side between the bright and dark displays becomes the longest. Further, at the intermediate gray-scale 3, as the subpixel 3 displays dark while the other subpixels displays bright, the total length of the boundary side between the bright and dark displays becomes the longest. As indicated by this example, because the dark/bright of the subpixels is selected in a manner that the total boundary side length always becomes the longest at each intermediate gray-scale, the beautiful intermediate gray-scale is realized per pixel according to the embodiment of the invention, even if introduction data to each subpixel are digital signals of the bright and dark.

Figure 11:
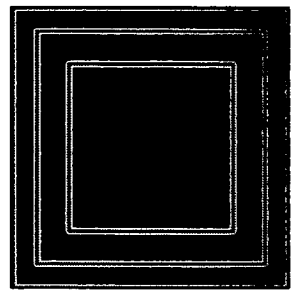
FIG. 11 explains pixels used in the electrophoretic display device of one embodiment of the invention and one exemplary method for driving the pixels.
Figure 11:
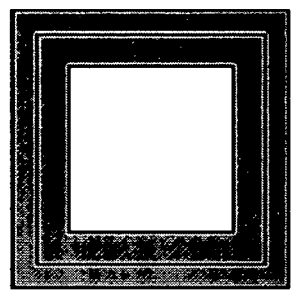
Figure 11:
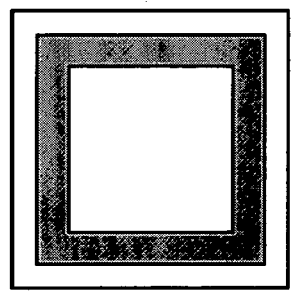
Figure 11:
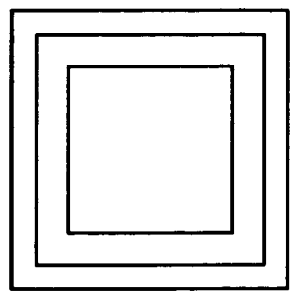

As can be seen in the examples of FIGS. 6, 9, and 10, by the subpixel selection method by which the total boundary side length is maximized, each subpixel performs the bright display or the dark display by approximately the same number of times on the average. Accordingly, the method may have an advantage in preventing persistence of the bright or dark display image per pixel. For example, although the examples of FIGS. 6 and 9 express four gray-scales, the bright display and the dark display are uniformly performed twice per subpixel. Also, in the example of FIG. 10, the subpixels 1 and 3 perform the dark display three times and the bright display twice, while the subpixels 2 and 4 perform the dark display twice and the bright display three times, and there is no uneven selection such as performing the dark display many times by any specific subpixel. If there is such an uneven selection by a subpixel that either one of the bright or the dark is displayed more than twice more than the other, the subpixel may persist and degrade the display quality of the complete bright or the complete dark display. For example, to use the driving method shown in FIG. 11, the inner subpixel displays white three times out of four times of the gray-scale display, and the middle subpixel displays black three times. Thus, white tends to persist in the inner subpixel, and whitish black tends to be displayed when trying to display black. In contrast, black tends to persist in the middle subpixel, and blackish white tend to be displayed when trying to display white. Consequently, the inner subpixel becomes whitish for the black display at the gray-scale 0, and the middle subpixel becomes blackish for the white display at the gray-scale 3, thereby weakening the overall contrast. However, as described hereinabove in the embodiments of the invention, by selecting the subpixels that perform the bright display or the dark display in a manner that the total boundary side length becomes the longest, all the subpixels become to evenly perform the bright and dark displays. Accordingly, the bright and dark persistence to the subpixels can be prevented, and both the beautiful gray-scale expression and a high contrast ratio can be realized at the same time.

As yet another method for driving the electrophoretic display device of another embodiment of the invention, it is preferable to form each pixel so as to contain n subpixels (n being an integer of 2 or more), to form the n subpixels so as to contain at least one subpixel out of the n subpixels that does not share the boundary with its adjacent pixel, and to select i subpixels (i being an integer between 1 and n) from the n subpixels as the bright display when displaying the brightness gray-scale i, in a manner that the display having a smaller area is located more towards the inside than the display having a larger area upon comparison of the total area of the dark display subpixels with the total area of the bright display subpixels, provided that a state in which all the n subpixels perform the dark display is the brightness gray-scale 0 and that a state in which the i subpixels perform the bright display and in which n–i subpixels perform the dark display is the brightness gray-scale i. Thus, the electrophoretic display device according to the embodiment of the invention is provided also with such a subpixel selection unit. In contrast, when displaying the brightness gray-scale i, it is also preferable to select i subpixels from the n subpixels as the bright display when displaying the brightness gray-scale i in a manner that the display having a smaller area is located more towards the outer side than the display having a larger area upon comparison of the total area of the dark display subpixels with the total area of the bright display subpixels. For this reason, the electrophoretic display device of the embodiment of the invention is also provided with such a subpixel selection unit.

Figure 12:
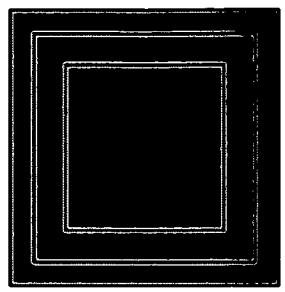
FIG. 12 explains pixels used in the electrophoretic display device of one embodiment of the invention and one exemplary method for driving the pixels.
Figure 12:
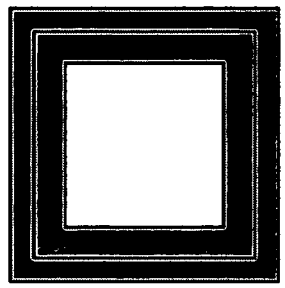
Figure 12:
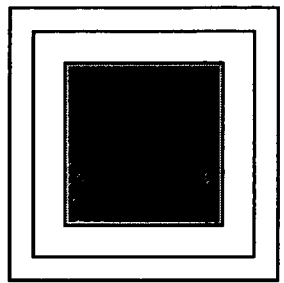
Figure 12:
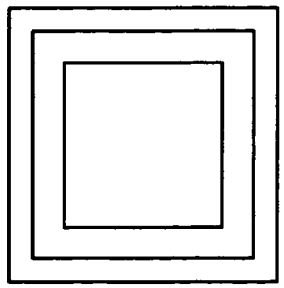
Figure 13:
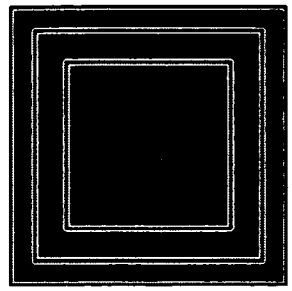
FIG. 13 explains pixels used in the electrophoretic display device of one embodiment of the invention and one exemplary method for driving the pixels.
Figure 13:
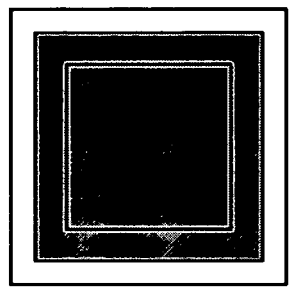
Figure 13:
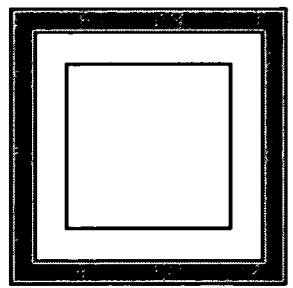
Figure 13:
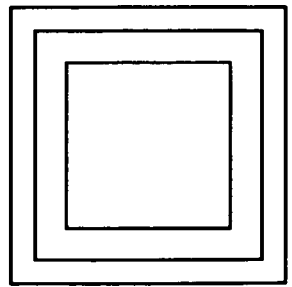

This will be explained using FIGS. 12 and 13. FIGS. 12 and 13 show pixels having the same configurations as those in FIG. 9, in that the subpixels having an equal area are arranged concentrically. FIG. 12 shows the driving method in which, when displaying the brightness gray-scale i, the subpixels are selected in a manner that the display having a smaller area is located more towards the inside than the display having a larger area upon comparison of the total area of the dark display subpixels with the total area of the bright display subpixels. More specifically, at the gray-scale 1, the inner subpixel displays bright, and the middle and the outer subpixels display dark so that the bright display is arranged at the inside of the pixel, since the bright display area is smaller than the dark display area. In contrast, at the gray-scale 2, the inner subpixel displays dark, and the middle and the outer subpixels displays bright so that the dark display is arranged at the inside of the pixel, since the dark display area is smaller than the bright display area. To the contrary to FIG. 12, FIG. 13 shows the driving method in which, when displaying the brightness gray-scale i, the subpixels are selected in a manner that the display having a smaller area is located more towards the outer side than the display having a larger area upon comparison of the total area of the dark display subpixels with the total area of the bright display subpixels. More specifically, at the gray-scale 1, the outer subpixel displays bright, and the middle and the outer subpixels display dark so that the bright display is arranged at the outer side within the pixel, since the bright display area is smaller than the dark display area. In contrast, at the gray-scale 2, the outer subpixel displays dark, and the middle and the outer subpixels display bright so that the dark display is arranged at the outer side within the pixel since the dark display area is smaller than the bright display area. By employing such a driving method, the effects of the fine mixture and the electric field are enhanced per pixel, and the beautiful intermediate brightness gray-scale can be realized. At the same time, because each pixel evenly performs the bright and dark displays, the image persistence can be prevented, and the contrast ratio increases also.

Figure 14:
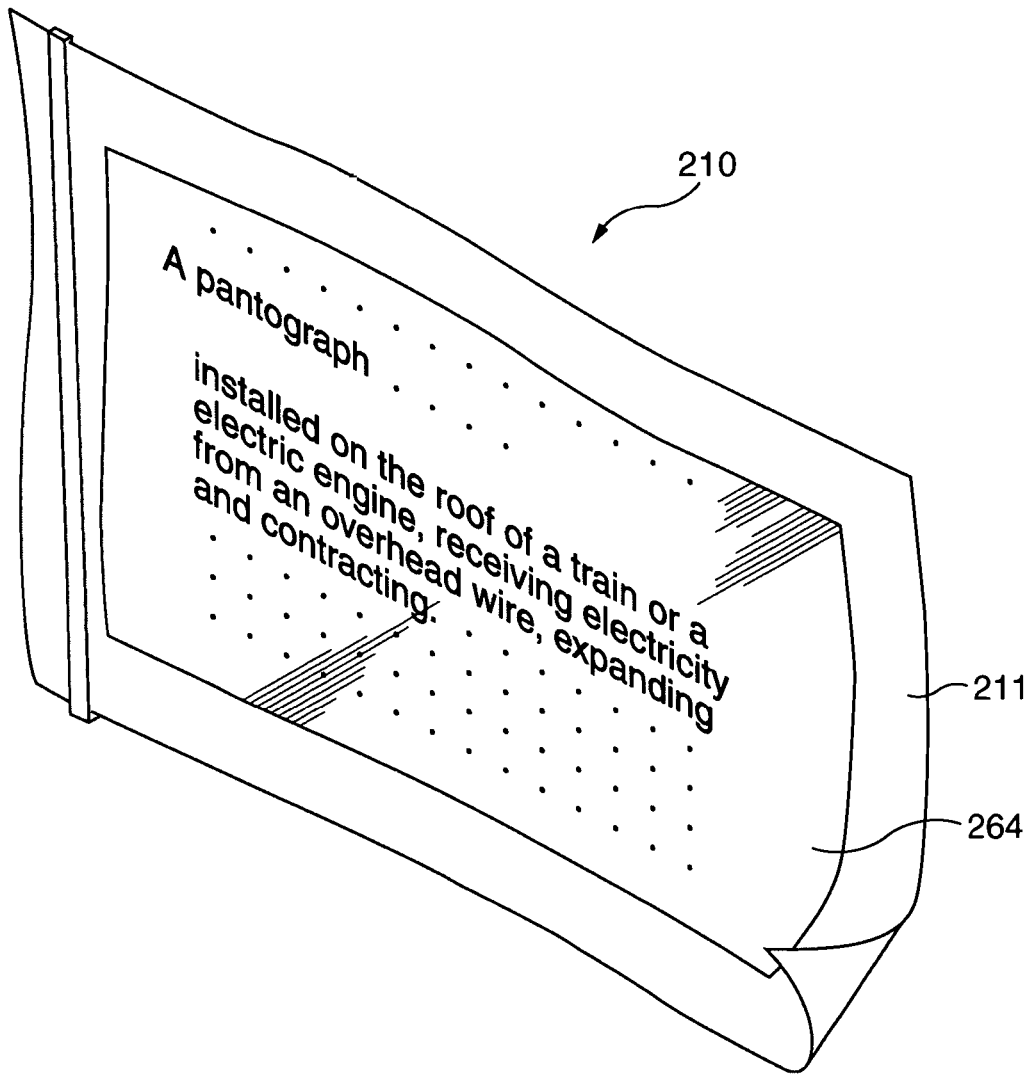
FIG. 14 is a perspective diagram illustrating an electronic paper using the electrophoretic display device.

Finally, an example will be described in which the electrophoretic display device according to the invention is applied to a flexible electronic paper. FIG. 14 is a perspective diagram of an electronic paper 210 applying the invention. The electronic paper 210 is equipped with a main body 211 having a paper-like texture and flexibility, and this main body uses the electrophoretic display device of the invention as a display unit 264. This electronic device uses the electrophoretic display device and its driving method of the invention and, thus, expresses the beautiful intermediate gray-scale per pixel and realizes the high contrast ratio. In addition, the electrophoretic display device of the invention can be mounted not only on the electronic paper but also on various types of electronic apparatuses as their display device. Such electronic apparatuses are, for example, electronic books, personal computers, digital still cameras, view-finder-type or direct-monitor-type videotape recorders, car navigation systems, pagers, electronic organizers, desk-top electronic calculators, word processors, workstations, televisions, telephones, POS terminals, and equipment provided with touch panels. The electrophoretic display device is suitable for these apparatuses as their display unit.

What is claimed is:

1. An electrophoretic display device sandwiching an electrophoretic material between a first substrate and a second substrate, the device comprising:
    a plurality of pixels being formed on the first substrate,
    each of the pixels being composed of n subpixels (n being an integer of 2 or more), the n subpixels having substantially the same area,
    wherein the n subpixels contain at least one pair of adjoining subpixels that are not able to be completely divided by a single straight line extending continuously across the pixel.

2. The electrophoretic display device according to claim 1, wherein the n subpixels contain at least one pair of adjoining subpixels whose boundary side is composed of a plurality of straight lines that extend at angles relative to one another.

3. The electrophoretic display device according to claim 1, wherein each of the pixels is composed of n subpixels (n being an integer of 3 or more), and
    wherein the n subpixels contain at least one pair of adjoining subpixels whose boundary side is longer than a boundary side of another pair of adjoining subpixels.

4. The electrophoretic display device according to claim 1, wherein at least one subpixel out of the n subpixels does not share a boundary with an adjacent pixel.

5. The electrophoretic display device according to claim 1, wherein a gap between the adjoining subpixels is 10 μm or less.

6. The electrophoretic display device according to claim 1, wherein a gap between the adjoining subpixels is shorter than a length expressed by $\sqrt{(S/n)}$ where S is an area of the pixel.

7. The electrophoretic display device according to claim 1, wherein the n subpixels contain at least one pair of adjoining subpixels whose boundary side is longer than $\sqrt{S}$ where S is the area of the pixel.

8. The electrophoretic display device according to claim 1, comprising a subpixel selection unit that selects i subpixels (i being an integer between 1 and n) from the n subpixels when displaying a brightness gray-scale i so that a boundary side separating a dark display subpixel from a bright display subpixel is longest, provided that a state in which all the n subpixels perform the dark display is a brightness gray-scale 0 and that a state in which the i subpixels perform the bright display and in which n−i subpixels perform the dark display is the brightness gray-scale i.

9. The electrophoretic display device according to claim 1, further comprising a subpixel selection unit which makes the i subpixels (i being an integer between 1 and n) located closer to a center of the pixel to perform a bright display by selecting the i subpixels from the n subpixels when displaying a brightness gray-scale i, provided that a state in which all the n subpixels perform the dark display is a brightness gray-scale 0 and that a state in which the i subpixels perform the bright display and in which n−i subpixels perform the dark display is the brightness gray-scale i.

10. The electrophoretic display device according to claim 1, further comprising a subpixel selection unit which makes the i subpixels (i being an integer between 1 and n) located farther from a center of the pixel to perform a bright display by selecting the i subpixels from the n subpixels when displaying a brightness gray-scale i, provided that a state in which all the n subpixels perform the dark display is a brightness gray-scale 0 and that a state in which the i subpixels perform the bright display and in which n−i subpixels perform the dark display is the brightness gray-scale i.

11. The electrophoretic display device according to claim 1, further comprising a subpixel selection unit which selects i subpixels (i being an integer between 1 and n) from the n subpixels as a bright display when displaying a brightness gray-scale i so that the display having a smaller area is located more towards an inside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i.

12. The electrophoretic display device according to claim 1, further comprising a subpixel selection unit which selects i subpixels (i being an integer between 1 and n) from the n subpixels as a bright display when displaying a brightness gray-scale i so that the display having a smaller area is located more towards an outside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i.

13. A method for driving an electrophoretic display device according to claim 1, the method comprising:
    selecting i subpixels (i being an integer between 1 and n) from the n subpixels as a bright display so that a boundary side separating a dark display subpixel from a bright display subpixel becomes longest when displaying a brightness gray-scale i, provided that a state in which all the n subpixels perform the dark display is a brightness gray-scale 0 and that a state in which the i subpixels perform the bright display and in which n−i subpixels perform the dark display is the brightness gray-scale i.

14. A method for driving an electrophoretic display device according to claim 1, the method comprising:
    selecting i subpixels (i being an integer between 1 and n) from the n subpixels as a bright display when displaying a brightness gray-scale i so that the display having a smaller area is located more towards an inside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i.

15. A method for driving an electrophoretic display device according to claim 1, the method comprising:
    selecting i subpixels (i being an integer between 1 and n) from the n subpixels as a bright display when displaying a brightness gray-scale i so that the display having a smaller area is located more towards an outside than the display having a larger area upon comparison of a total area of the dark display subpixels with a total area of the bright display subpixels, provided that a state in which all the n subpixels perform the dark display is a brightness gray-scale 0 and that a state in which the i subpixels perform the bright display and in which n−i subpixels perform the dark display is the brightness gray-scale i.

* * * * *